(12) United States Patent
Ivers et al.

(10) Patent No.: US 6,213,442 B1
(45) Date of Patent: Apr. 10, 2001

(54) ISOLATION SYSTEM FOR ISOLATION TABLES AND THE LIKE

(75) Inventors: Douglas E. Ivers; Leslie P. Fowler; Russell E. Altieri; Stephen F. Buchner, all of Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/168,545

(22) Filed: Oct. 8, 1998

(51) Int. Cl.[7] .......................... F16M 13/00; F16M 1/00; F16M 3/00; F16M 5/00; F16M 7/00

(52) U.S. Cl. ............................. 248/550; 248/644

(58) Field of Search ................... 248/644, 550; 73/668

(56) References Cited

U.S. PATENT DOCUMENTS

| | | | |
|---|---|---|---|
| 4,850,261 | 7/1989 | Greene | 91/362 |
| 4,976,415 | 12/1990 | Murai et al. | 267/136 |
| 5,011,108 | 4/1991 | Chen et al. | 248/550 |
| 5,285,995 | * 2/1994 | Gonzalez et al. | 248/550 |
| 5,308,938 | 5/1994 | Roberts et al. | 187/115 |
| 5,321,923 | 6/1994 | Oda | 52/167 |
| 5,379,980 | 1/1995 | Houghton, Jr. et al. | 248/550 |
| 5,400,872 | 3/1995 | Slalski et al. | 187/393 |
| 5,436,545 | * 7/1995 | Bahr et al. | 318/727 |
| 5,444,417 | * 8/1995 | Botti et al. | 248/550 |
| 5,449,985 | 9/1995 | Kanemitsu et al. | 318/128 |
| 5,638,303 | 6/1997 | Edberg et al. | 364/559 |
| 5,652,704 | * 7/1997 | Catanzarite | 248/550 |
| 5,653,317 | * 8/1997 | Wakui | 248/550 |
| 5,693,990 | 12/1997 | Miyazaki | 310/15 |
| 5,765,800 | 6/1998 | Watanabe et al. | 248/550 |
| 5,793,598 | 8/1998 | Watanabe et al. | 361/144 |
| 5,832,806 | * 11/1998 | Nelson | 248/550 |
| 5,876,012 | 3/1999 | Haga et al. | 248/550 |
| 5,881,987 | * 3/1999 | Hara | 248/550 |

FOREIGN PATENT DOCUMENTS

| | | |
|---|---|---|
| 2104179 | 8/1993 | (CA) . |
| 0 584 790 A1 | 3/1994 | (EP) . |
| 0 767 320 A2 | 4/1997 | (EP) . |
| 0 789 160 A2 | 8/1997 | (EP) . |
| 0 814 279 A2 | 12/1997 | (EP) . |
| 09112628 | 5/1997 | (JP) . |
| 10082448 | 3/1998 | (JP) . |

OTHER PUBLICATIONS

Kojima, Nagaya, Niiyama and Nagai, Vibration Control for a Beam Structure Using A Electromagnetic Damper With Velocity Feedback, Bulletin of JSME, vol. 29, Mo. 254, Paper No. 254–43, Aug. 1986.

Lee, DeBra, Michelson, Taber, Price, Six Degrees Of Freedom Vibration Isolation Using Electromagnetic Suspension, N93–27559, pp. 75–84, 1993.

* cited by examiner

Primary Examiner—Anita M. King
Assistant Examiner—Jerome DeLuca
(74) Attorney, Agent, or Firm—Randall S. Wayland; Michael M. Gnibus

(57) ABSTRACT

An isolation system includes a housing that contains an electromagnet, a sensor and a controller. The housing is mounted underneath a table top of an isolation table (or other structure requiring isolation from a second body), and target elements, such as permanent magnets, are associated with the frame of the table in proximity to the housing. The sensor provides an input signal representative of motion of the table to the controller, which generates a control signal for the electromagnet to produce a force acting on the target element. The housing can be attached to the table top with magnets, which facilitate installation. The housing provides a unit that is simple to install, is unobtrusive, and advantageous for retrofitting existing isolation tables.

30 Claims, 9 Drawing Sheets

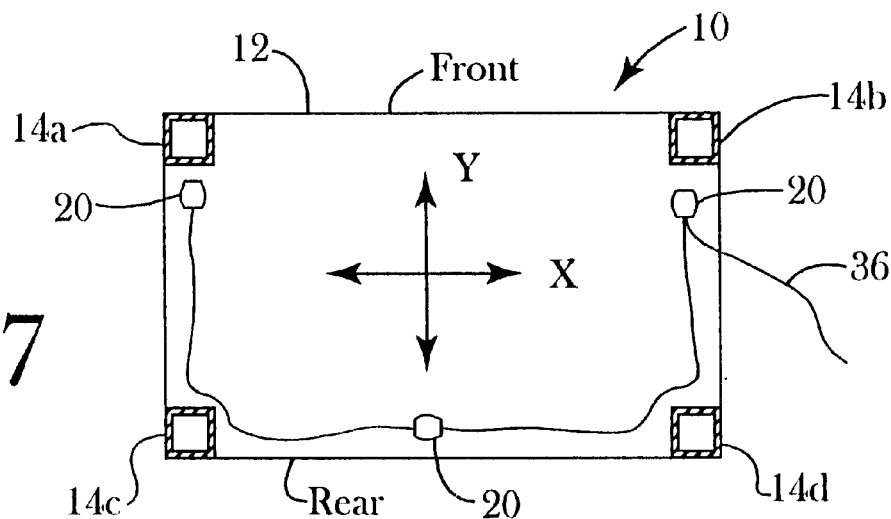
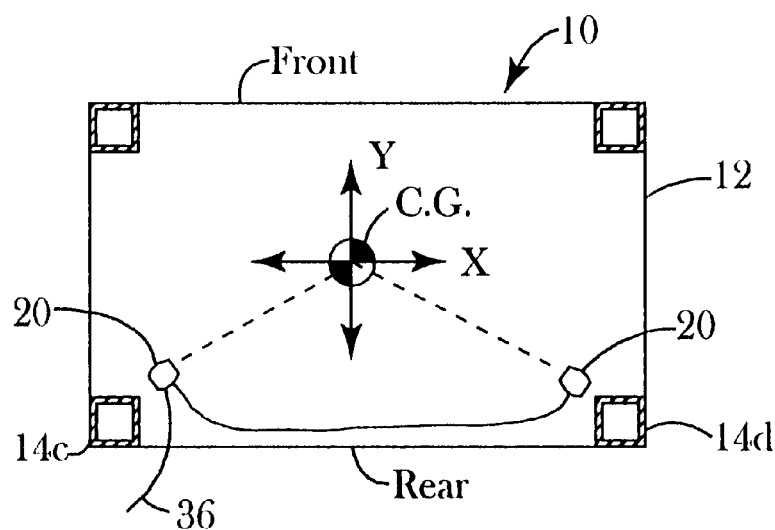
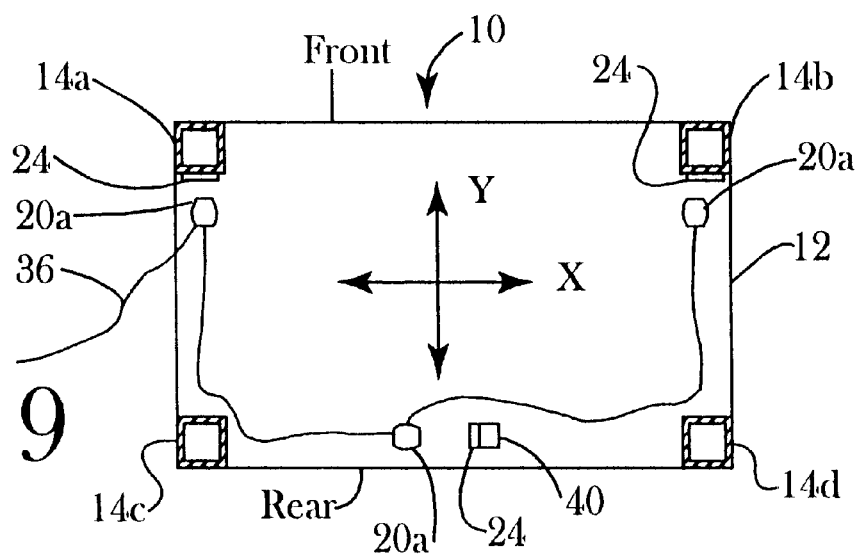

ISOLATION SYSTEM FOR ISOLATION TABLES AND THE LIKE

BACKGROUND AND SUMMARY OF THE INVENTION

The invention is directed to devices for isolating one body from vibration transmitted by another body. In particular, the invention provides a low cost, self-contained, active isolation system that can be readily mounted to an isolation table, or similar structure, to control vibrational disturbances.

Electromagnet actuators are especially well suited for generating forces in situations where the relative displacements are low. Electromagnets are low cost and inexpensive device to operate, which is an additional advantage. Known systems using electromagnets in vibration isolation tables are unduly complicated and lack ease of installation or adjustment. Further, known systems are not readily adaptable for retrofit into an existing isolation table or other structure.

The invention overcomes the deficiencies in the art to provide an isolation system having at least one electromagnet actuator to generate force for canceling vibration in an isolated body (e.g., the table top) transmitted by a supporting body (e.g., the table frame or legs). According to the invention, the system comprises a device having an electromagnet, a motion sensor, and a controller all contained within a single housing that is easily mounted to the isolated body. One or more of the devices can be mounted to the isolated body depending on what modes of vibration are of concern.

Housing the components in a single container or housing facilitates mounting the device to an isolation table, and reduces installation cost and complexity. The housing makes the devices less conspicuous and less intrusive for the user. According to the invention, the housing can be mounted to the table top (which are typically made of a ferrous metal) with permanent magnets, which provides instant attachment and the ability to easily remove and reposition the housing, if desired. Other attachment means, such as adhesives or screw fasteners, could be used as alternatives.

The invention is advantageously installed on an isolation table to act in parallel with a spring system supporting the table on a frame or legs. Such spring systems are typically pneumatic, but the invention can work with other types of spring supports.

According to a preferred embodiment, the sensor is an accelerometer which produces a signal representative of acceleration in the table top. The signal is processed by the controller, which generates a control signal for the electromagnet to cause it to produce a force for canceling the vibration. A preferred control mode is to integrate the acceleration signal to obtain a velocity, and then to feedback a sum of the proportioned acceleration and velocity. Alternatively, another motion sensor could be used with appropriate control. For example, a geophone, velocimeter, or a displacement sensor could be used to sense motion of the table top.

According to one aspect of the invention, a target element is included for the electromagnet to act against with a vibration-canceling force. According to a preferred embodiment, the target element is a permanent magnet. The target element is attached to the supporting frame or legs and the housing is mounted to the table top in proximity to the magnet so that a gap is established between the electromagnet and permanent magnet. The permanent magnet produces a bias that permits the electromagnet to generate a push or a pull force on the permanent magnet, making the vibration canceling forces more effective. Isolation tables typically have horizontal support rails near the table top. For vertical vibration, the target element is conveniently mounted to the rail. For systems without rails between the legs, brackets can be mounted on the legs to provide for a target element. For horizontal vibration, the target element can be mounted to a table leg or bracketry. The housing is appropriately oriented so that the electromagnet is positioned to generate a force acting on the target element across a gap.

According to the invention, the target element alternatively may be a magnetically sensitive element, such as a ferrous metallic member, for which the electromagnet will produce an attractive force. Accordingly, a bias can be applied to the electromagnet by applying a DC input, or by installing a permanent magnet in the electromagnet, so that both attractive and repulsive forces can be generated for effective vibration canceling.

According to another aspect of the invention, the controller includes input and output signal processing. The input processing includes means for trimming any DC bias that might be present thereby adjusting for any DC drift that may result from processing of the input signal. Moreover, at least one, and preferably both, the input and output signal processing may include active gain switching means for switching between a first low gain value to a second higher gain value, preferably by means of a programmable gain amplifier. This provides an adequate strength signal to the control method and/or the actuator for a large range of transmitted vibration levels. Furthermore, one or both of the input and output processing may include means for monitoring the signals for system health monitoring.

The devices according to the invention can include a single electromagnet for single direction vibration control. Alternatively, the device housing can contain two electromagnets relatively oriented for damping in different directions. Sensors are included in the housing for measuring movement in each direction. In addition, target elements are associated with each electromagnet and may, when separate elements, be attached to the table frame at appropriate locations.

A table top is subject to various vibrational disturbances that can cause different movements of the table top, including simple linear vertical vibration, roll movement, pitch movement, longitudinal and lateral horizontal movement, and yaw movement. A system according to the invention includes an isolation table provided with a plurality of devices for controlling these different modes of vibration.

According to one embodiment, a table top is provided with three damping devices for controlling all of the vertical based movements: linear vertical, pitch, and roll vibrations. The devices each include a single electromagnet and associated target permanent magnet. One device is positioned at each of the front two legs of the table, and one device is positioned along the back edge of the table top midway between the back legs. The devices act independently at the various locations and produce damping forces to control the three mentioned vibration movements. The relative spacing and positioning of the active damping units about the table top optimizes the control forces required.

A three-device system advantageously provides vertical vibration control with a minimum number of devices. Alternatively, a table can be provided with four damping devices, one positioned at each table leg, for more robust damping control, i.e., less control force required for each device.

An isolation table can be provided with two devices for control of the two horizontal modes of vibration. The devices are mounted to the table top at adjacent legs with the target elements mounted to, or integral with, each of the legs. Preferably, to position the devices as unobtrusively as possible, the devices are positioned at the back legs. The devices are appropriately aligned to produce a diagonal force vector which passes through the Center of Gravity (CG) of the table. In this way, the longitudinal and lateral movements can be controlled.

According to another embodiment, the devices each include vertically and horizontally oriented electromagnets contained in the single housing, and an isolation table is configured for control of both vertical and horizontal vibration in all six modes. Advantageously, control of all six modes can be achieved with three devices mounted to the table, one each at the front legs and a third at the back edge midway between the back legs. Target elements are positioned on each of the front legs and on the support rails adjacent the front legs. Additionally, a target element is positioned on the rear support rail for vertical control, and a bracket mounted to the rear rail extends vertically upward to support an additional target element for horizontal control by the rear positioned device.

Other configurations are also possible, for example, using multiple damping devices for more robust vibration control. In addition, if a particular form of vibration or movement is a concern, for example, because of the equipment carried on the isolation table, the devices can be positioned accordingly. As one example, for a robot oriented lengthwise on an isolation table, multiple devices can be mounted to the table and oriented for producing horizontal canceling force directed in the longitudinal direction.

Another advantage of the system according to the invention is that having all of the active components in a single housing permits the simple retrofit of existing isolation tables or other structures. In addition, when magnet mountings are used, the damping in an isolation table can be easily adjusted, or even adapted temporarily for a particular use, by adding devices to the table or changing the position or orientation of the devices on the table.

The foregoing and other aspects will become apparent from the following detailed description of the invention when considered in conjunction with the accompanying drawing figures.

BRIEF DESCRIPTION OF THE DRAWINGS

The invention will become better understood by reference to the following description in conjunction with the appended drawings, in which:

FIG. 7 is a schematic diagram of the system of FIG. 6;

FIG. 8 is a schematic diagram of an alternative system for horizontal damping;

FIG. 9 is a schematic diagram of an alternative system for both vertical and horizontal damping;

DETAILED DESCRIPTION OF THE PREFERRED EMBODIMENTS

Figure 1:
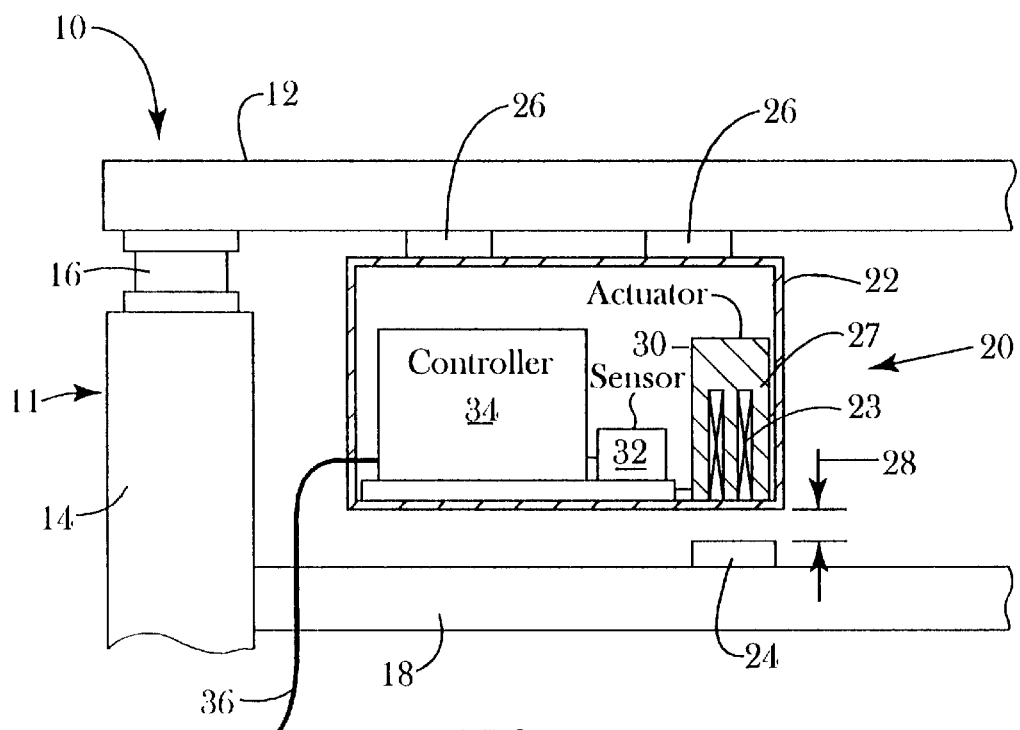
FIG. 1 is a side view of a damping device for single mode damping in accordance with the invention mounted to an isolation table.

FIG. 1 shows an isolation table 10 including a damping device 20 in accordance with a first embodiment of the invention. As will become apparent to those skilled in the art, the device according to the invention isolates a second member from vibration transmitted from a first member by producing forces to cancel the vibration in the second member. The invention is particularly suited for isolation tables, as is described herein, but has application to other apparatuses, for example, engine mounts, rotating equipment, and turbomachinery, and the description is meant to be illustrative rather than limiting.

The isolation table 10 includes a table top 12 supported by a frame 11 having a plurality of legs 14 (only one leg is shown in FIG. 1). Adjacent legs of the table frame 11 are preferably interconnected by horizontal rails 18 to provide rigidity to the frame. The rail is usually omitted from the front edge of the table 10 to provide room for an operator's legs to extend under the table. A spring system 16 is mounted between the leg 14 and the table top 12 to isolate the table top from the legs. Typically, the spring system 16 is a pneumatic isolator with a low spring stiffness. A problem in undamped spring systems is an inability to handle vibration occurring at or near the resonance frequency of the system. Moreover, they may amplify low frequency vibrations. The present invention, used in parallel with a spring system, will cancel vibration at or around the resonance frequency and/or at low frequencies.

The damping device 20 in FIG. 1 includes a container 22 mounted to the underside of the table top 12, and a target element 24 associated with and mounted to the frame 11 in proximity to the container and below the electromagnet 30. The container 22 and target element 24 are thus easily installed and are positioned conveniently out of direct view and out of the way of an operator using the table. The container 22 houses the active components of the device, including a force-generating electromagnet 30, as a self-contained unit. The container 22 is a rigid box that provides an interior space to house the active components, described below. The container can be formed as an aluminum casting, as a folded or stamped sheet metal box, or other suitable structure.

The active components of the damper device unit 20 include an electromagnet 30, a motion sensor 32, and a controller 34. The electromagnet 30 includes a pole piece 27 and a coil 23 and is of the type manufactured by Magnetic Products, Inc. of Highland Mich. Specifically, model RE-12121 rated at maximum pull load of 35 lbf (156.8 N) was found to be particularly effective in the device 20. The motion sensor 32 senses movement of the table top 12 and sends an input signal representative of the motion to the controller 34. Preferably, the motion sensor is an accelerometer manufactured by Oceana Sensors Technologies, Inc. of Virginia Beach, Va. Model number A8000-01 with 1 Volt/g sensitivity was found to be particularly effective. The controller processes the input signal, and generates and sends a control signal to the electromagnet 30 to produce a magnetic force. A power cord 36 provides electric power to the active components in the container 22. It should be understood that the arrangement of the components within the container is exemplary and the locations thereof may vary.

The container 22 can be mounted to the table top 12 by any suitable means, including, for example, mechanical fasteners (screws, bolts, or rivets), adhesives, and double-sided tapes. When the table top 12 is made of a ferrous metal, it is particularly convenient to mount the container 12 with one or more mounting magnets 26, which permit both instant mounting without preparation of the table, and the ability to easily remove or change the position of the container 22, if necessary. FIG. 1 illustrates the mounting magnets 26 outside the container 12; however, it is also possible to position the magnets 26 inside the container for a cleaner appearance.

The container 22 is mounted to the table top 12 with a gap 28 between the electromagnet 30 and the target element 24, which in this case is mounted to the rail 18. As seen in FIG. 1, the electromagnet 30 is positioned in opposition to the target element 24 across the gap 28. The force produced by the electromagnet 30 acts on the target element 24 to counteract the disturbance movement sensed by the sensor 32, and thus cancel vibration in the table top 12. The width of the gap 28 should be as small as possible without the container 22 and target element 24 coming into contact for optimum force effectiveness.

Figure 4:
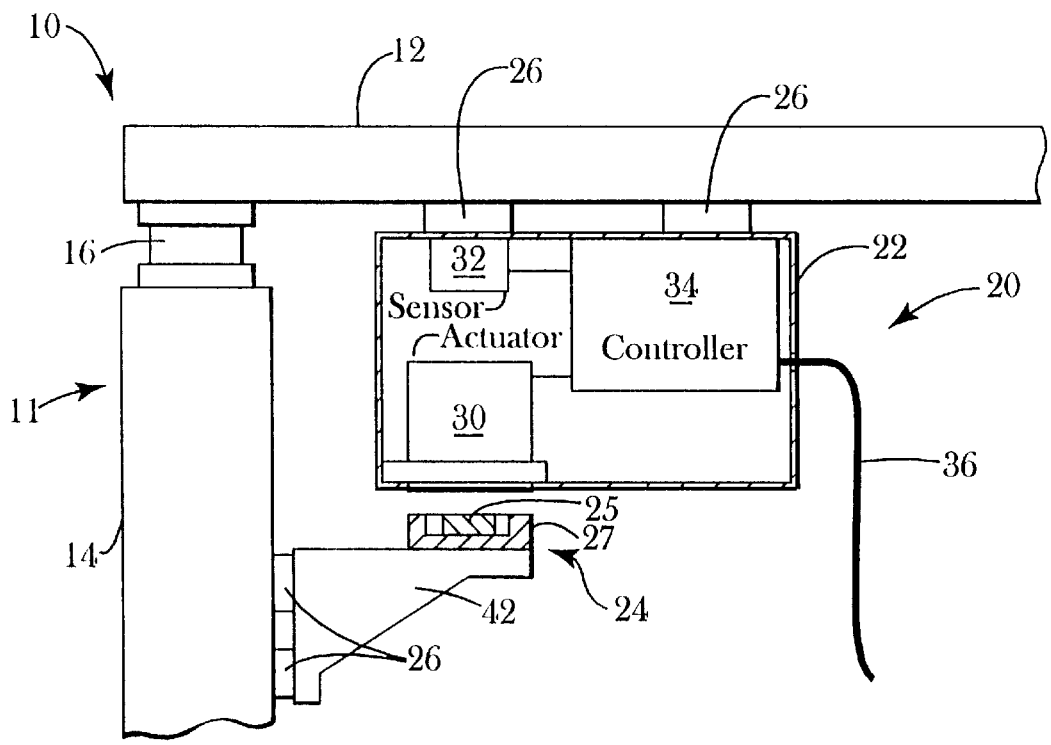
FIG. 4 is a side view of a damping device mounted to an isolation table on which a support bracket is mounted to support a target element.

The vibration disturbances transmitted from the floor to the table top 12 are typically on the order of 0.2 to 20 microns (0.000008 to 0.0008 inch) for isolation tables. Due to pneumatic table resonances, unacceptably high vibration levels are transmitted to the table top 12. However, small movements of the table top require only a low force produced by the electromagnet for vibration damping. A force in the range of 0.5 to 1.0 lbf has been found to be effective when the devices are used with the Model VH, VW, and LW isolation tables manufactured by Newport Corporation, for example. In a system integrated with tables of this type, the gap 28 is preferably between about 0.05 inches (1.27 mm) and 0.45 inches (11.4 mm), and a gap of about 0.125 inches (3.18 mm) has been found to be quite effective and allows some sway space to avoid hard contact between the active damping units and the frame 11. Preferably, the gap 28 is made as small as practicable whilst still accommodating static motions due to loss or shut off of pneumatic pressure to the air springs and/or transient loads applied to the table top 12. The actuator 30 may protrude through the container 22 slightly, as shown in FIG. 4, in an effort to minimize the gap 28 between the actuator and target element 24. Moreover, the table top 12 may be raised or lowered using its adjusting screws to set the appropriate gap 28.

According to a preferred embodiment of the invention, the sensor 32 is a piezoelectric accelerometer to sense acceleration of the table top 12. Alternatively, other motion sensing devices could be used, for example; a geophone, velocimeter, or other sensing device. The particular sensor selected will effect and require adjustments to the control algorithm, as will be understood by those skilled in the art.

Figure 2A:
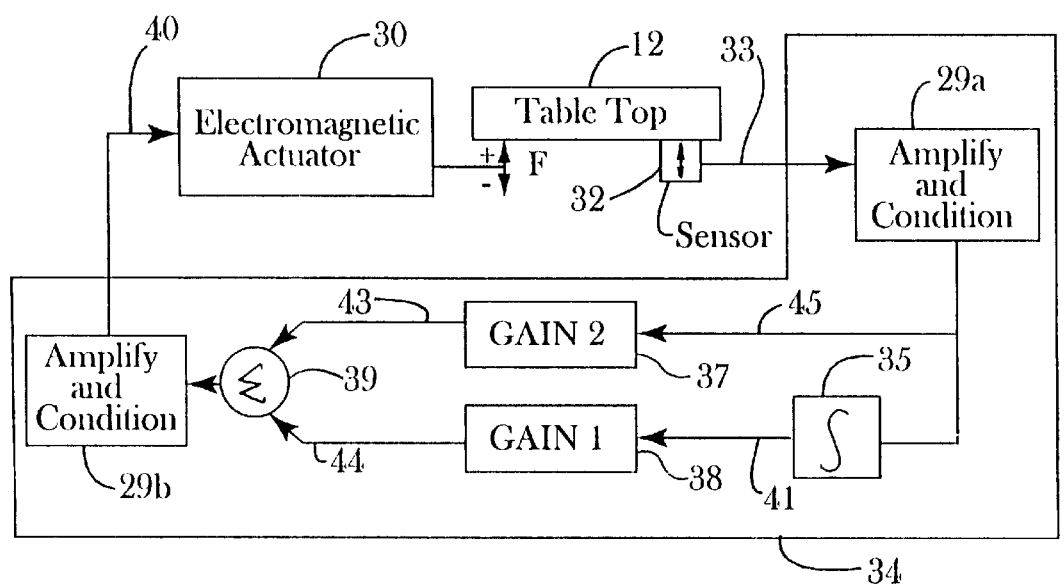
FIG. 2a is a schematic diagram of an exemplary feedback control loop for the damping devices according to the invention.
Figure 2B:
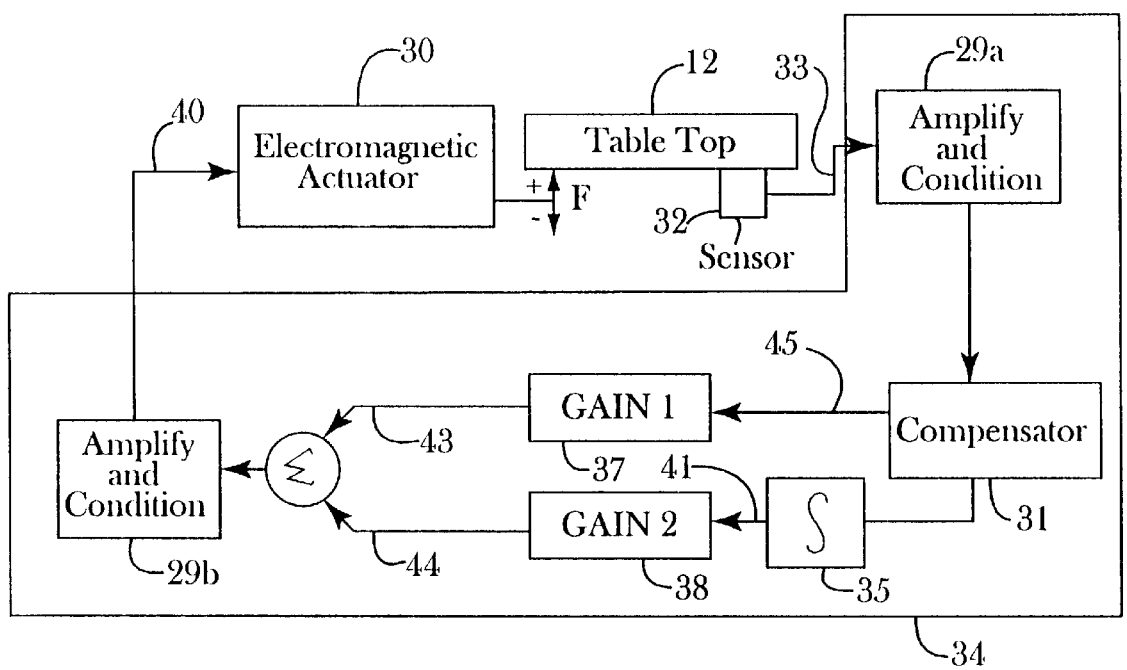
FIG. 2b is a schematic diagram of another embodiment of feedback control loop for the damping devices according to the invention.
Figure 2C:
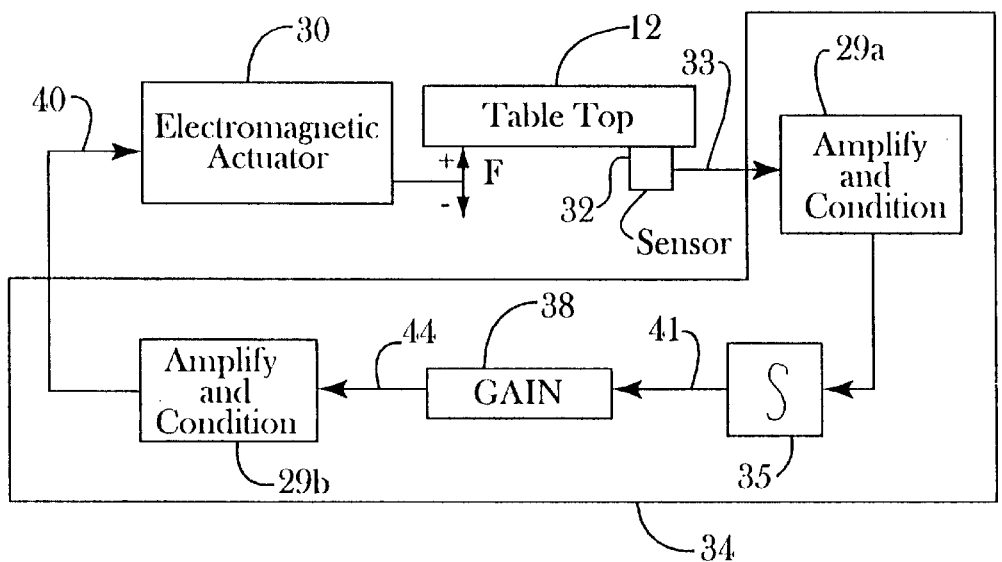
FIG. 2c is a schematic diagram of yet another embodiment of feedback control loop for the damping devices according to the invention.

For example, as illustrated in FIGS. 2a and 2c, a feedback control method based on the acceleration and velocity may be used. The acceleration (e.g. vertical) of the table top 12 is sensed by the sensor 32 and an input signal representing acceleration in line 33 is transmitted to the controller 34. Within the controller, the input signal is amplified and conditioned in block 29a as will be described in more detail later herein. This highly amplified and conditioned signal is provided to an integrator 35 where an integration is performed to obtain a signal representative of velocity of the table. The representative velocity signal in line 41 and the representative acceleration signal in line 45 are then again scaled (amplified or attenuated) in first and second gain blocks 37, 38 to produce gain-adjusted and relatively weighted representative acceleration and velocity signals in lines 43 and 44, respectively. The gains 37, 38 are selected based upon experience with the system and are preferably hard coded into the micro-controller.

A summation of the gain-adjusted signals 43, 44 is performed at summing junction 39. Following the summation, the summed signal is again amplified and conditioned in block 29b thereby producing a control signal 40 which is provided to the electromagnet actuator 30. The electromagnet 30 produces a control force F to cancel the movement of the table top 12. Combined acceleration and velocity control provides better high frequency vibration control than velocity feedback alone (described with reference to FIG. 2c) and broadens the effective range of control.

The FIG. 2b embodiment differs from the FIG. 2a in that an additional compensator 31 is provided. The compensator 31 is a low frequency lead compensator which causes a phase lead at low frequencies. More specifically, the compensator provides a maximum of 15 degrees phase lead centered at 0.5 Hz. This compensator 31 improves performance of the device 20 by compensating for the phase lag caused by the sensor 32 and input signal conditioning and amplification 29a. As shown, the block diagram of FIG. 2a depicts vertical vibration control. However, it should be understood that the present invention and the control described herein are equally useful for controlling horizontal vibrations of the table 12. Moreover, when used in multiples, multiple modes may be controlled, as described later herein. The device 20 according to the invention is controlled for providing damping at the resonance frequency of the table system 10, which is typically between about 1 to 4 Hz. Preferably, the device 20 acts at frequencies between about the 0.2 to 10 Hz range. The aforementioned control method used is very stable, such that any transient loads applied to the table top 12 will be effectively damped.

A simpler control method is shown in FIG. 2c. In this method, the acceleration of the table top 12 is sensed by the accelerometer sensor 32. This signal representative of acceleration in line 33 is amplified and conditioned in block 29a and then integrated in integrator block 35 to produce a signal representative of velocity of the table top 12 in line 41. This signal in line 41 is appropriately amplified or attenuated in gain block 38. Again the gain value is determined based upon knowledge of, and experience with, the system. The gain multiplied signal 44 is then amplified and conditioned again in block 29b and then passed on as a control signal 40 to the electromagnet actuator 30. Velocity feedback provides for good control of the resonances of the table top. Notably, if a velocimeter or geophone is used as the sensor, the integrator 35 would be deleted.

The damping device 20 in FIG. 1 is arranged to provide a vertically directed damping force; that is, the electromagnet 30 is oriented to act across the vertically-aligned gap 28 between the container 22 and the target element 24. The device 20 may be positioned for damping horizontally directed vibration by simply positioning the target element 24 on a vertical surface so that a horizontally-aligned gap is provided, and orienting the container 22 so that the electromagnet 30 is in opposition to the target element 24 across the gap 28.

In addition, according to a preferred embodiment, the target element 24 is a permanent magnet, which provides a continuous bias to the electromagnet 30. The bias permits operation of the electromagnet 30 for generating both pushing and pulling forces relative to the table frame 18, which facilitates canceling vibration movements. An additional advantage of a permanent magnet as the target element 24 is ability to instantly attach it to the table frame 11 when the frame is formed of a ferrous metal.

Alternatively, the target element 24 could be a magnetically sensitive mass, that is, a mass that the electromagnet force will attract or it could be a ferrous leg, rail or other portion of the frame 11. In such an embodiment, a bias can be applied to the electromagnet by supplying a DC input. Of course, this is less desirable than using a permanent magnet because of the higher power requirements.

Figure 3:
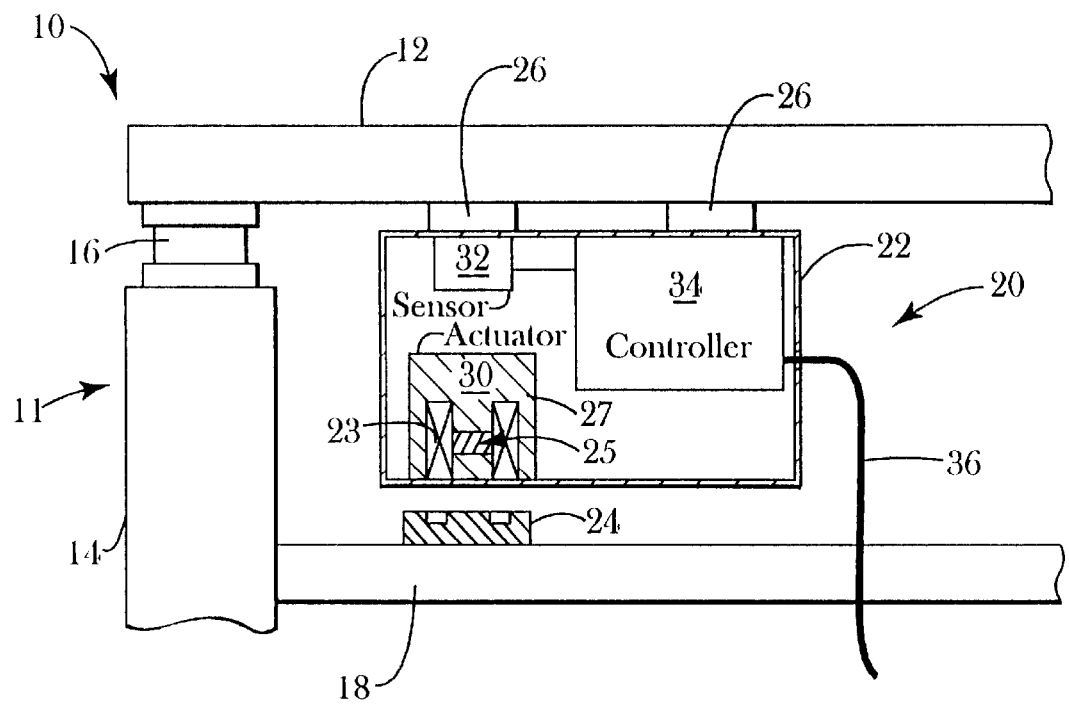
FIG. 3 is a side view of a damping device according to another embodiment mounted to an isolation table.

FIG. 3 illustrates an alternative embodiment in which a disc-shaped permanent magnet 25 is disposed in the electromagnet 31 to provide the bias. The target element 24 is a magnetically permeable pole piece that can magnetically react with the magnet and electromagnet force fields. Alternatively, if the rail 18 is formed of a material having sufficiently high magnetic permeability, the target element 24 can be eliminated, and the rail 18 can act as the target element. This alternative provides the advantage that all of the components of the device are contained in the container 22, which further simplifies installation.

FIG. 4 illustrates a feature of the invention for isolation tables not having horizontal ails, or where the horizontal rail is not sufficiently close to the table top 12 to be suitable for holding the target element 24. A bracket 42 is mounted to the leg 14 of the frame 11 to support the target element 24 in proximity to the table top 12. The bracket 42 provides a surface on which the target element 24 is mounted. Preferably, the bracket 40 is mounted by mounting magnets 26, similar to those used for mounting the container, which allow for ease of positioning and installation of the bracket. FIG. 4 also illustrates another alternative for the target element 24, that is, a target element consisting of both a permanent magnet 25 mounted on a pole piece 27. The combination of a permanent magnet with the pole piece increases the effective area on which the electromagnet field can act.

Figure 5:
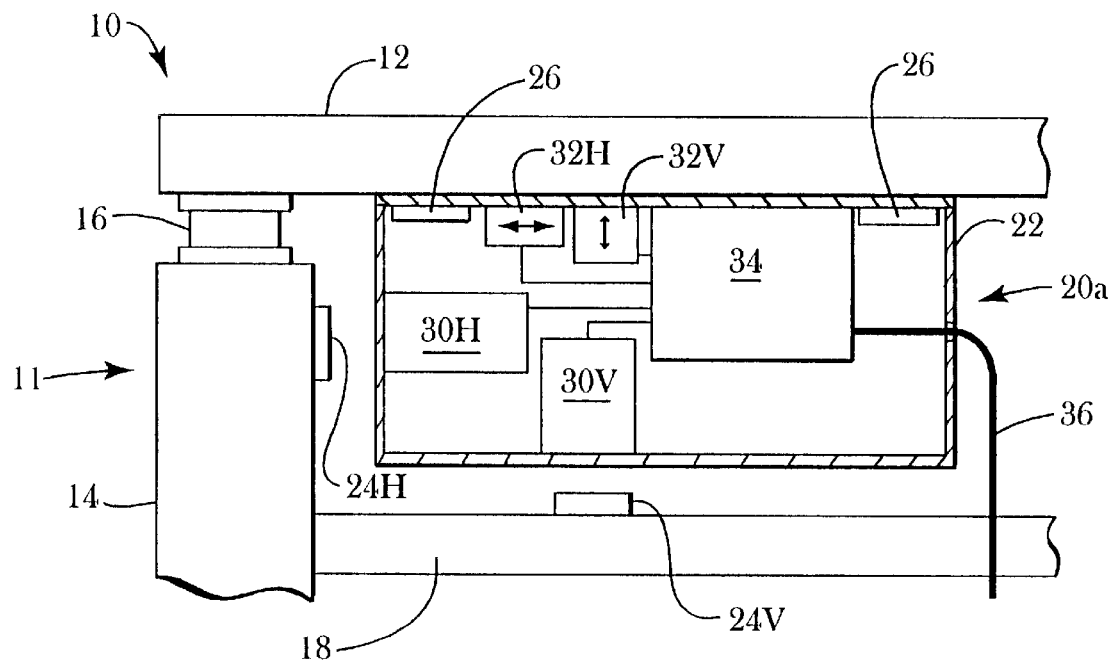
FIG. 5 is a side view of a damping device for two mode damping mounted to an isolation table.

FIG. 5 illustrates an embodiment of the device 20a adapted for damping vibrations in both the vertical and horizontal directions. The container 22 includes two sensors 32V, 32H: a first 32V oriented for sensing vertically directed vibration, and a second 32H oriented for sensing horizontally directed vibration (arrows shown indicate sensing direction). Two electromagnets 30V, 30H are provided: a first 30V positioned to produce a vertical force, and the second 30H positioned for producing a horizontal force. Accordingly, two target elements 24H, 24L are mounted to the frame 11, one on the table leg 14 to interact with the horizontal force electromagnet 30H, and the second on the rail 18 to interact with the vertical force electromagnet 30V. The single controller 34 is adapted to receive the input signals from the sensors 32V, 32H and to produce control signals for the two electromagnets 30V, 30H. Control for the individual directions is accomplished via the control method described with reference to FIG. 2a.

Figure 6:
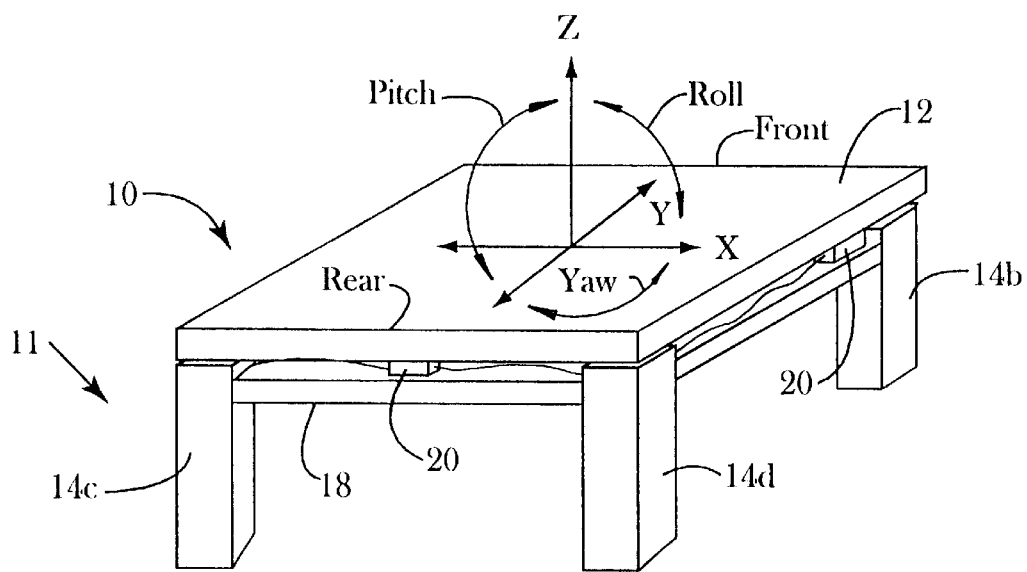
FIG. 6 is a perspective view illustrating a system according to the invention including an isolation table including damping devices arranged for vertical damping.

FIG. 6 illustrates in perspective view an isolation table 10 including a reference coordinate frame to illustrate the types of vibration movements that could be experienced by the table top 12. Disturbances transmitted to the table top 12 can result in simple vertical vibration along the Z axis, that is, simple up and down motion. If the vertical disturbance is unequal in amplitude or in time across the table top 12, rocking motions may occur, for example, a pitch movement in the YZ plane, a roll movement in the XZ, or a motion combining pitch and roll.

In addition, a disturbance could result in vibration of the table top 12 in the horizontal or XY plane, including simple linear movement on the X or the Y axis, or a yaw movement in the XY plane. Various ways to mount the devices 20, 20a according to the system of the invention to cancel these disturbances are described below.

The most common are the vertical movements, the simple linear vertical and the pitch and roll vibrations. The system shown in FIGS. 6 and 7 is arranged to cancel any of these three vertically directed vibrations. For example, FIG. 7 shows a bottom view of the table 10. The table 10 includes three mutually-spaced, vertically-acting active damping unit devices 20 as described in FIGS. 1, 3 or 4. One device 20 is mounted to the table top 12 adjacent to each of the two front legs 14a, 14b. An accompanying target element (not shown), preferably a permanent magnet, is mounted to, or integral with, the side rails (not shown) in proximity to each of the damping devices 20, as described in connection with FIGS. 1, 3 or 4. A third damping device 20 is positioned midway between the two rear legs 14c, 14d with a target element mounted adjacent on, or integral with, the rear rail (also not shown). The devices 20 act independently, that is, the controllers of the respective devices are not connected for coordinated action, and thus, each device 20 acts to cancel vibration that is sensed at its individual mounting location. The power cable 36 shown in the FIG. 7 is run in the manner shown to keep wiring from the power supply located on the floor the table to a minimum. This reduces the propensity for vibration to be imparted to the table 12 through multiple electrical cords.

Again referring to FIG. 7, it can be understood that the three devices 20 will act to cancel linear vertical vibration (Z axis movement-into and out of the paper). Pitch movement in the YZ plane is handled by cumulative action of the front damping devices 20 and the rear damping device 20 acting on opposite front and rear edges of the table top. Roll movement in the XZ plane is handled by cumulative action of the damping devices 20 at the opposite sides of the table at the front legs 14a and 14b. The illustrated arrangement requires a minimal number of damping devices to cancel vibration of three degrees of freedom. Of course, additional damping devices could be installed if more robust damping is required, for example, one damping device could be positioned at each leg.

FIG. 8 illustrates an arrangement useful for damping only the horizontal vibration disturbances, the X axis and Y axis linear vibrations. The damping devices 20 are positioned adjacent to each of the rear legs 14c, 14d, and are oriented for providing a horizontal force directed against the respective leg. The damping devices are also oriented diagonally with respect to the axes, which allows the damping devices to act with a force vector through the center of gravity CG without creating a torque about the Z axis. The associated target elements (not shown) are mounted on, or integral with, the legs. Alternatively, additional devices could be mounted to the table top for increased damping or for controlling yaw motions.

According to another aspect of the invention, an isolation table 10 can be provided with damping devices 20a for damping in both the horizontal and vertical directions, and thus act to cancel all six modes of vibration movement in the table top. FIG. 9, for example, illustrates an embodiment using a minimum number of damping devices 20a to achieve damping of all six modes. The damping devices 20a each include two electromagnets mounted in the container 22 as described in connection with FIG. 5. The damping devices 20a are placed adjacent to the front legs 14a and 14b and preferably midway between the rear legs 14c and 14d. Two target elements 24 are associated with each damping device 20a. At the front side, the target elements are positioned on, or integral with, the rails (not shown) for vertical damping and on the legs 14a, 14b for horizontal damping along the X axis. The rear damping device 20a is mounted to the table top 12 with a first associated target element installed on, or integral with, the rear rail (not shown). A bracket 40 is mounted to the rail (not shown) and extends upward to support a second target element 24 for horizontal damping along the Y axis.

Figure 10:
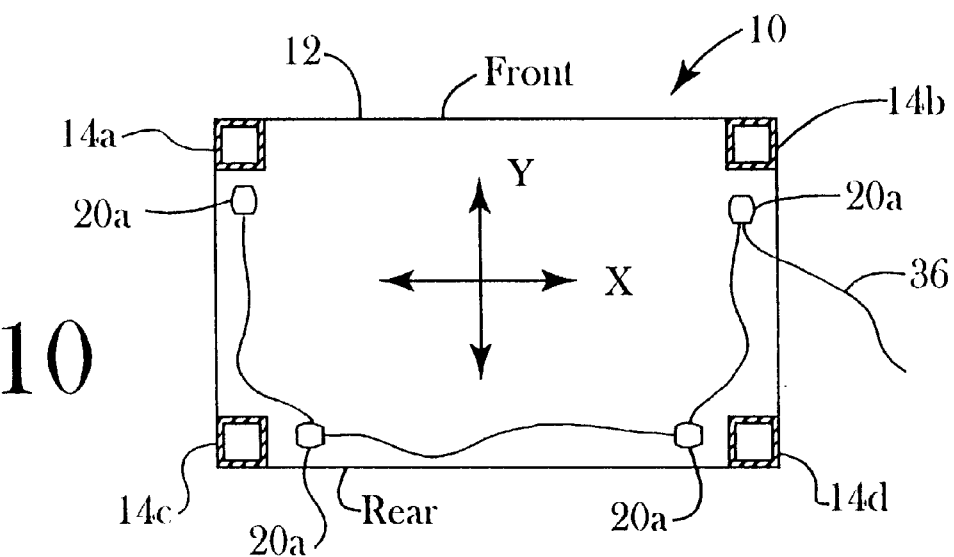
FIG. 10 is a schematic diagram of an alternative embodiment of the system of FIG. 9.

The arrangement in FIG. 9 relies on the two devices 20a at the front to cancel horizontal vibration in the Y axis and a single damping device 20a at the rear of the table to cancel horizontal vibration along the X axis. FIG. 10 illustrates an arrangement in which two damping devices 20a are positioned at the rear legs 14c, 14d for improved damping along the X axis. Likewise, the front damping devices 20a are oriented for damping along the Y axis in conjunction with target elements included on, or integral with, the legs 14a, 14b. Additional target elements installed on, or integral with, the rear and side frame rails (not shown) act with the front rear damping devices 20a to cancel vertical vibration along the Z axis. Thus, in the arrangement shown in FIG. 10, the two damping devices 20a at the front of the table act to cancel vertical and Y axis horizontal vibration, and the two damping devices at the rear of the table act on vertical and X axis vibrations. The cumulative action of the damping devices 20a acts on the pitch, roll and yaw movements, as previously explained as well as vibrations along the X, Y and Z axes.

Figure 11:
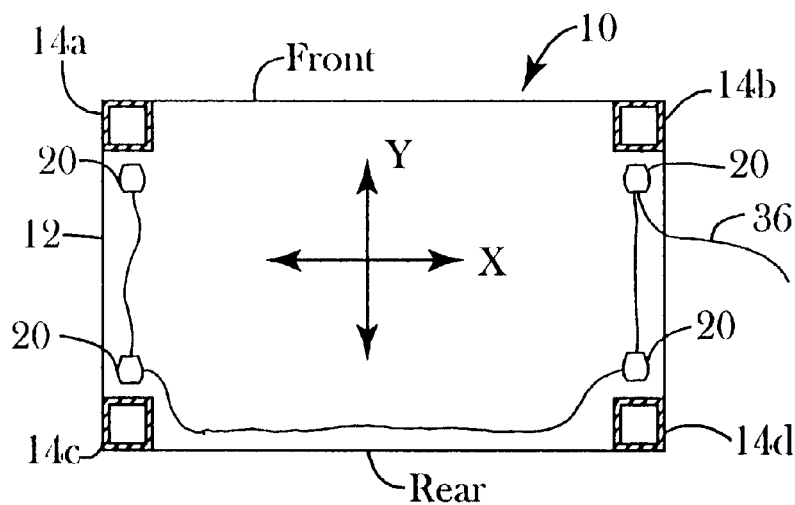
FIG. 11 is a schematic diagram of a system for increased front to back vibration control.
Figure 12:
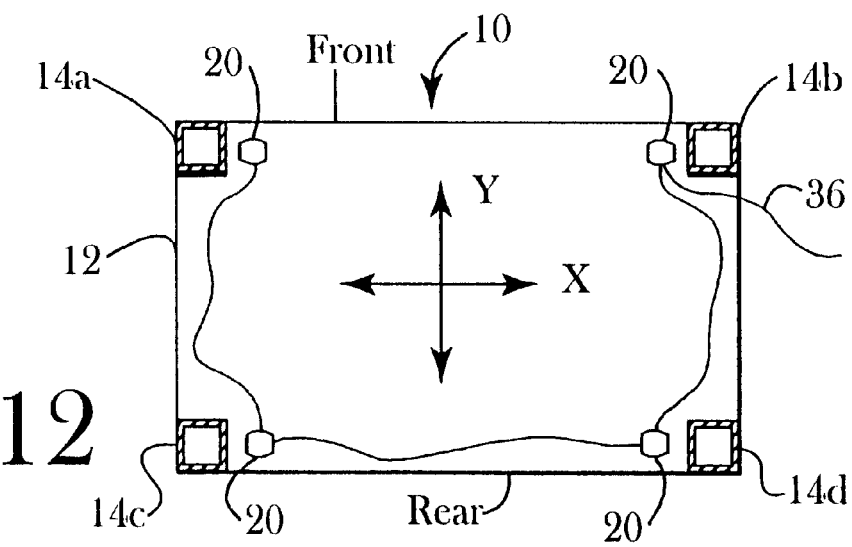
FIG. 12 is a schematic diagram of a system for increased side to side vibration control.

FIGS. 11 and 12 illustrate arrangements that are useful where a particular form of horizontal vibration is of concern. FIG. 11 shows an arrangement for strong damping along the Y axis. The damping devices 20 are positioned so that the horizontally-oriented electromagnets act along the Y axis. This arrangement is useful for devices, such as robots, that are supported on the table top 12 across the width, and which accordingly produce strong vibrations along the Y axis.

FIG. 12 shows an arrangement useful for excess X axis vibration, for example, for a robot or similar apparatus supported across the length of the table top 12. The damping devices 20 are accordingly positioned so that the horizontally-oriented electromagnets act along the X axis. In the arrangements shown in FIGS. 11 and 12, the damping devices 20 can also be equipped for both horizontal and vertical damping using the device illustrated in FIG. 5.

Figure 13:
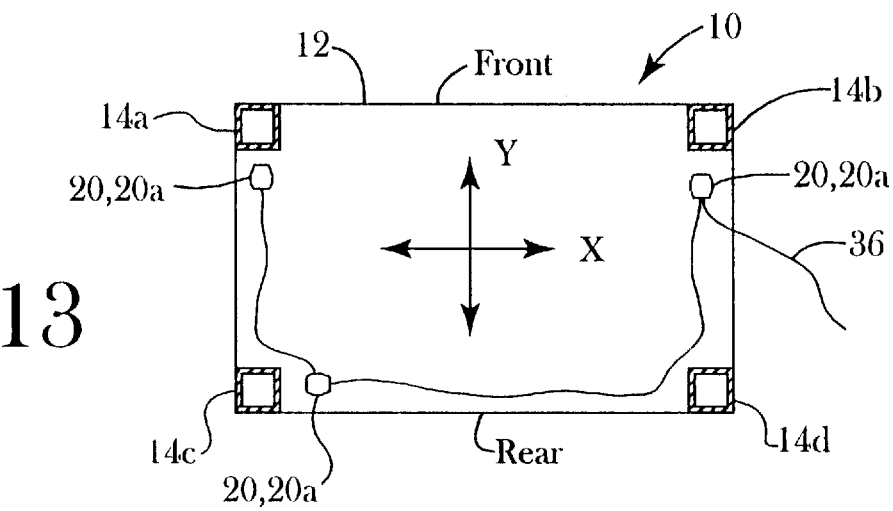
FIG. 13 is a schematic diagram of an alternate embodiment of the system shown in FIG. 7.
Figure 14:
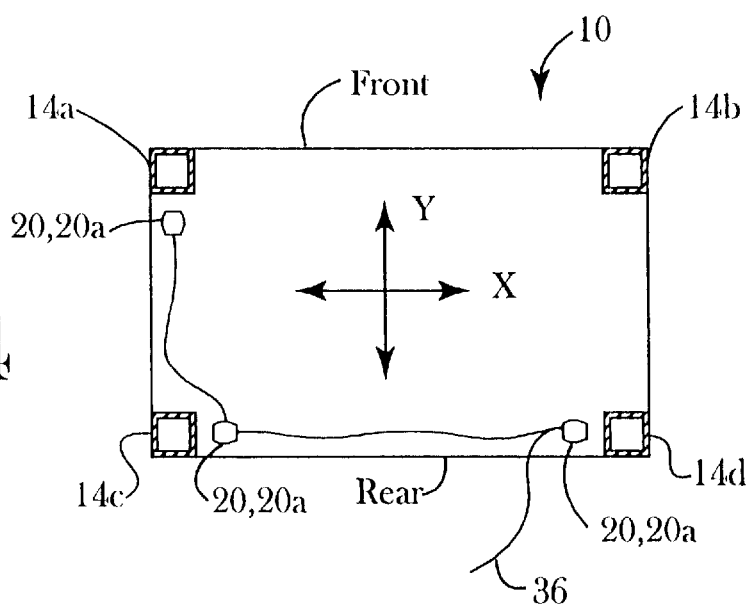
FIG. 14 is a schematic diagram of a system with minimal bracketry.

FIGS. 13 and 14 shows several other arrangements useful for multi-mode vibration control. In FIG. 13, the units 20, 20a may be horizontally acting alone or multi-axis devices as shown in FIG. 5. This FIG. 13 embodiment is an alternate embodiment to that shown in FIG. 7. The arrangement in FIG. 13 can damp vibration along the X and Y axes as well as yaw about the Z axis. If the units are of the type described in FIG. 5, then vertical motion along the Z axis, pitch motion in the YZ plane and roll motion in the XZ plane may also be controlled. This arrangement is particularly well suited for controlling Y axis vibrations. Notably, when the system does not include vertical damping, the units preferably act directly upon the legs 14a, 14b and 14c of the table 10, i.e., the target element is the respective leg. Alternatively, similar target elements as shown in FIGS. 1, 3, or 4 may be mounted to the legs. FIG. 14 illustrates a system with a slightly different configuration as compared to FIG. 13. In general, the system of FIG. 14 can damp X, Y, Z, pitch, roll and yaw motions, if the units 20a as shown in FIG. 5 are utilized. If units 20a are utilized, this embodiment eliminates the brackets required for the embodiment of FIG. 9. This system is generally most effective at damping X axis vibration.

Figure 15A:
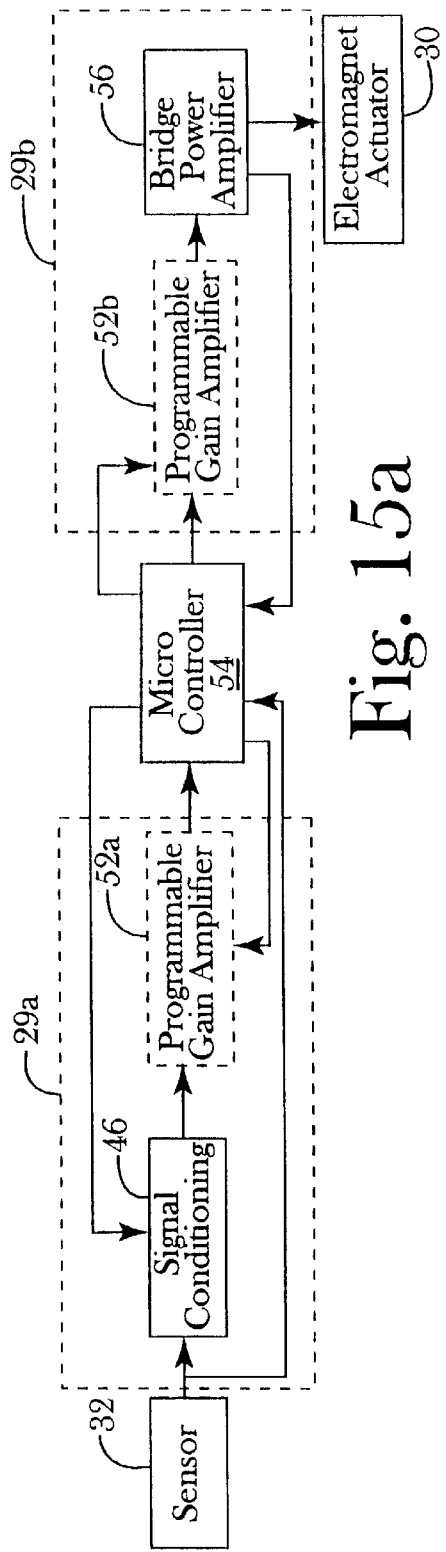
FIGS. 15a and 15b are block diagrams illustrating the components of the device and the controller therefor; an FIGS. 16 and 17 are block diagrams illustrating the components of the input and output processing.
Figure 15B:
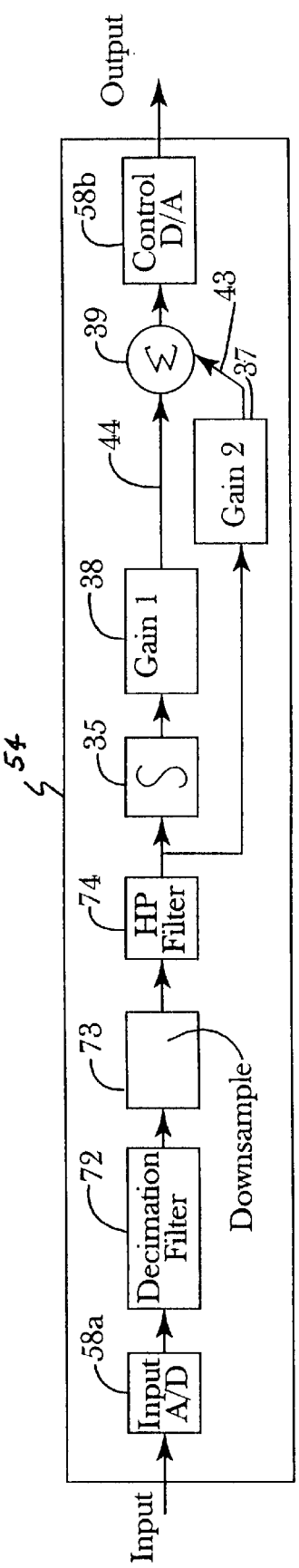
Figure 16:
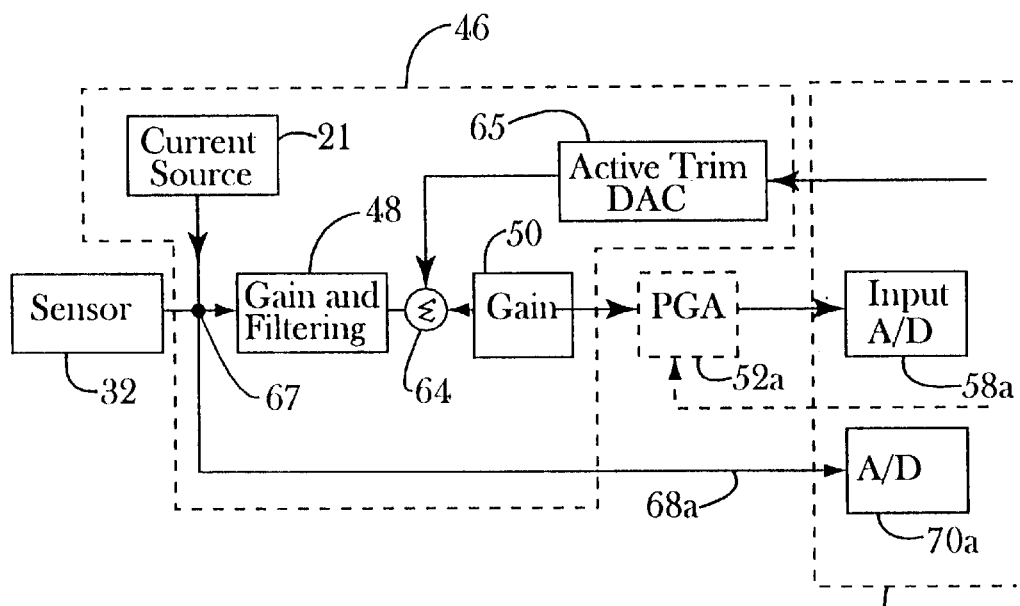
Figure 17:
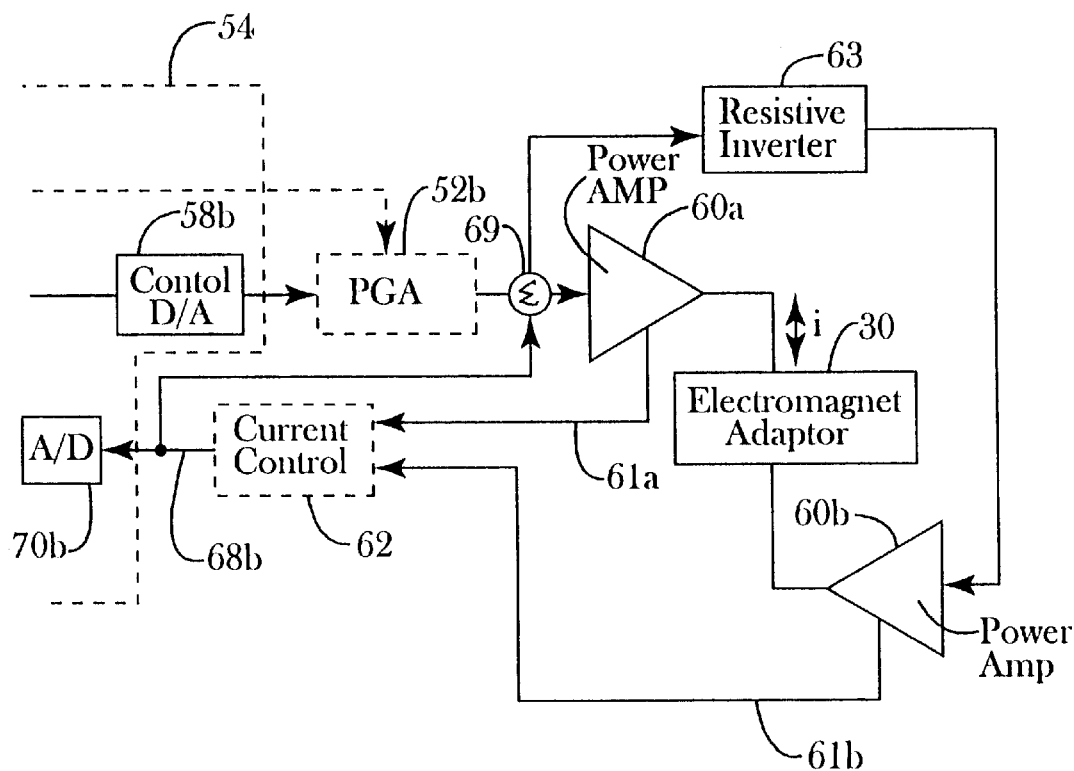

FIGS. 15a–17 illustrate details of the damping device 20, focusing on the electronic hardware aspects. The sensor 32, preferably the accelerometer described above, provides a signal representative of the acceleration. The current source 21 provides the current to operate sensor 32 thereby providing the input signal to the input conditioning and amplifying block 29a. The input conditioning and amplifying block 29a includes a signal conditioner 46 and may also include an optional Programmable Gain Amplifier 52a. The signal conditioner 46, as best shown in FIG. 16, includes a gain and filtering block 48 which includes a high pass filter, a low pass filter, a capacitor (about 10 microfarad) and operational amplifier. Effectively, the gain and filtering block 48 provides an output signal which has been multiplied by a gain, most preferably a gain of five (5), and having signals outside of the desired operational range removed. In the case of the isolation table, it is desired to remove signals outside the range of between about 0.04 Hz and 90 Hz. This filtered and amplified signal is then provided to a gain block 50 which further multiplies the signal by an additional gain value. Preferably, for the isolation table, the additional gain value is set to about fifty (50).

The output of gain block 50 is preferably provided to means for actively switching between a first and second gain value. In this case, the active switching means is comprised of an optional Programmable Gain Amplifier (PGA) 52 which is actively switchable between gains of a low and a high value. By way of example, and not to be considered limiting, the low value is preferably about 3.52 and the high value is preferably between about 30–60, but may be as high as 250. The gain value selected is dependent upon the magnitude of the incoming signal to the input A/D 58a as a function of its total dynamic range. Preferably, the input D/A is integral within the micro-controller 54 and samples the signal provided from the optional input PGA 52a at about 1000 Hz. It is desirable to utilize the Programmable Gain Amplifier (PGA) 52 in cases where the magnitude of the signal present is unknown or changeable through broad ranges. If the average power of the signal is above a threshold, then the gain is set to the first setting, whereas, if the average power is below the threshold, then the gain is set to a second higher value. This ensures that a signal of appropriate signal strength is provided to the microcontroller 54. A similar PGA is preferably provided on the output processing portion of the device 20 as has been described for the input processing portion and is switched according to the similar, but opposite, logic and at the same time, i.e., if input PGA 52a has gained up the signal, then output PGA 52b will gain it back down by preferably the same amount. Notably, if the PGA is not used, then the gain value of gain block 50 would need to be set higher, say about 176, such that a total system input gain of about 880 is achieved. Such high gains, of 750 or greater, are desired for achieving good system performance when subjected to base disturbances of between about 2–10 microns and when using a 8-bit microcontroller.

According to another aspect of the invention, means for adjusting the DC bias of the input signal is provided. As shown in FIG. 16, the microcontroller 54 monitors the nominal DC level of the signal provided at the input D/A 58a and outputs a value to the Active Trim Digital to Analog Converter (DAC) 65 which resultantly provides a DC voltage which either adds or subtracts from the DC voltage outputted from the gain and filtering block 48 at the junction 64. This active trim function maintains the incoming signal voltage at a nominal value, for example at about 2.5 volts. This maintains the DC voltage centered within the voltage range thereby allowing maximum use of the dynamic range.

The input and output processing portions may also include monitoring means useful for detecting failures of the sensor 32 and/or actuator 30 within the device 20. The input monitoring means comprises extracting the signal at junction 67 representative of the raw accelerometer signal. The signal is provided via line 68a to the monitoring A/D 70a in the micro-controller 54. The signal is then tested to determine if it falls within a preset range. If it does, it is indicative of a properly operating sensor 32.

Within the micro-controller 54, which is preferably a Motorola 68HC705P6ACDW, a control method is executed, such as any of the methods described with reference to FIGS. 2a–2c. An output signal is provided from the control D/A 58b to the optional output PGA 52b at a sample frequency of about 200 Hz. The controller preferably includes multi-rate sampling as described in co-pending application U.S. Ser. No. 09/053,478 to Hamo et al. entitled "Dynamic System Controller" which is hereby incorporated by reference herein. The signal from the PGA 52b is then provided to a bridge amplifier 56 which includes multiple power amps 60a, 60b positioned on either side of the electromagnet 30 and a current control block 62 for providing feedback control to ensure that the control signal to the amps 60a, 60b is in actuality what is being commanded. The control signal from the PGA 52b drives power amp 60a directly. Contrarily, by way of resistive inverter 63 which inverts the control signal, power amp 60b is driven in the opposite direction thereby creating an alternating current scenario across the windings of the electromagnet actuator 30. Preferably, feedback means are utilized to measure the current supplied through the power amps 60a, 60b and then feedback a signal which is additive with the control signal to appropriately adjust same. Feedback signals proportional to the current supplied to each power amp 60a, 60b are fed to the current control block 62 via feedback lines 61a, 61b. These signals are then combined to produce an output at line 68b. This output is provided at junction 69 and is summed with the control signal thereat. This constantly corrects the current i through the electromagnet such that it is approximately equal to the controlled (commanded) current. The signal in 68b is also provided to the A/D converter 70b within the micro-controller 54 to provide the means for monitoring the current to the electromagnet 30. If the voltage value present is within a predetermined tolerance of the control signal commanded, then the electromagnet 30 and bridge power amplifier 56 are operating properly. If the signal is unchanging, then it is indicative of a short or other circuit dysfunction.

In FIG. 15b, the operations taking place within the micro-controller 54 are illustrated. The filtered and amplified input signal is provided from the PGA 52a to the input A/D 58a which converts the analog signal to digital form at the sample rate aforementioned. A decimation filter 72 is provided which is a low pass filter, preferably first order, having a break frequency of less than 90 Hz, and more preferably about 40 Hz. An additional high pass filter 74 having a break frequency of about 0.125 Hz is provided for further rejecting low frequency noise. The signal is then down sampled in down sampling block 73 at 200 Hz by sampling approximately every $5^{th}$ sample exiting from the decimation filter 72. The output of the down sampling block 73 is then integrated in integrator 35 in a first path and multiplied by a first Gain 1 in block 38. Similarly, the a second path is provided where the down sampled signal is multiplied by a second Gain 2 in block 37. The signal in the first and second paths are then summed at summing junction 39 and then provided to the control D/A 58b for transmittal to the actuator 30. It should be noted that the amplify and condition block 29a in FIGS. 2a–2c comprises the signal conditioning block 46, the PGA 52a, the A/D 58a, decimation filter 72, HP filter 74 and down sampling 73. Likewise, the Amplify and condition block 29b comprises the control D/A 58b, the output PGA 52b and the bridge power amp 56. The bridge power amp 56 includes the power amps 60a, 60b and current control 62.

The invention has been described in terms of preferred principles and structure; however, the particular examples given are meant to be illustrative and not limiting. Substitutions and equivalents as will occur to those skilled in the art are included within the scope of the invention as defined by the following claims. For example, the number and arrangement of the units may be changes to effectively damp the dominant motions in the system. In addition, although described with reference to an isolation table, the invention can be used for any structure for isolating one member from another, such as in engine or machine mounts structures.

What is claimed is:

1. An isolation device for isolating vibration between a first member and a second member, the isolation device comprising:
   a target element sensitive to a magnetic field, the target element adapted to be removably mounted on the first member, and
   an active unit associated with the second member proximate the target element, the active unit comprising:
      a housing adapted to be removably mounted to a second member, said housing containing:
      an electromagnet including a pole piece and a coil;
      a sensor for producing an input signal representative of movement of the second member; and
      a controller for receiving and processing said input signal to derive a control signal to energize said coil to produce a magnetic field in said pole piece to act on said target element thereby controlling vibration of the second member.

2. The isolation device of claim 1, wherein the target element is a permanent magnet mounted on said first member.

3. The isolation device of claim 1, wherein the target element is formed of a magnetically responsive material.

4. The isolation device of claim 3, wherein the electromagnet includes a permanent magnet to provide a bias.

5. The isolation device of claim 1, wherein the sensor is an accelerometer producing said input signal which is representative of acceleration of said second member.

6. The isolation device of claim 5, wherein said acceleration signal is integrated to produce a signal representative of velocity which is then fed back to provide said control signal.

7. The isolation device of claim 5, wherein said acceleration signal is integrated to produce a signal representative of velocity, said signal representative of acceleration and said signal representative of velocity signal are then multiplied by first and second gains, respectively, to produce a gain-adjusted acceleration signal and a gain-adjusted velocity signal, and then said gain-adjusted acceleration and velocity signals are summed to provide said control signal.

8. The isolation device of claim 1, further comprising an additional target element associated with the first member, and wherein the housing further contains an additional electromagnet and an additional sensor connected to the controller, wherein the electromagnet and additional electromagnet are oriented to generate force on different axes.

9. The isolation device of claim 1, further comprising a plurality of magnets to attach the housing to the second member.

10. The isolation device of claim 1 wherein said sensor is a velocimeter or geophone and provides a signal representative of velocity.

11. The isolation device of claim 1, further comprising feedback means for actively trimming a direct current bias from said input signal.

12. The isolation device of claim 1, further comprising means for monitoring at least one of said input signal and said control signal to determine system health.

13. The isolation device of claim 1, further comprising active means for switching an input gain between a first low level and a second higher value in response to a changeable magnitude input.

14. The isolation device of claim 13, further comprising active means for switching an output gain between a first low level and a second higher value.

15. The isolation device of claim 1, further comprising a bridge power amplifier driving said electromagnet.

16. An isolation table including the isolation device of claim 1, the isolation table further comprising:
a table, the active unit removably attached underneath the table;
a frame including a plurality of low-stiffness isolators supporting the table relative to the frame, said target element being associated with said frame;
said active unit being positioned in proximity to said target element and with a gap therebetween.

17. An actively controlled isolation table, comprising:
a table;
a frame, including a plurality of low-stiffness isolators supporting the table relative to the frame;
a target element responsive to a magnetic field, the target element being removably attached to the frame;
an active unit removably attached to the table in proximity to the target element and with a gap therebetween, the active unit and target element being repositionable along the isolation table, the active unit comprising:
a housing, the housing containing:
an electromagnet including a coil to generate a magnetic field and a pole piece for directing the magnetic field, the electromagnet positioned in opposition to the target element across the gap;
a sensor for producing an input signal representative of a vibration in the table, and
a controller for processing the input signal to produce a control signal which energizes the coil to generate a magnetic field;
wherein, the magnetic field is directed by the pole piece to act against the target element to cancel the vibration in the table.

18. The actively controlled isolation table of claim 17, further comprising a bracket mounted to the frame to support the target element.

19. The actively controlled isolation table of claim 17, wherein the target element is a permanent magnet mounted on the frame.

20. The actively controlled isolation table of claim 17, wherein the target element is a pole piece, and the electromagnet includes a permanent magnet.

21. The actively controlled isolation table of claim 17, wherein the housing is attached to the table with permanent magnets.

22. The actively controlled isolation table of claim 17, wherein the target element is a first target element and the active unit is a first active unit, and further comprising a second target element associated with the frame and second active unit attached to the table in proximity to the second target element, and a third target element associated with the frame and third active unit attached to the table in proximity to the third target element, wherein the first, second, and third active units are positioned in a mutually spaced relationship.

23. The actively controlled isolation table of claim 22, wherein the frame has four legs, and wherein the first active unit is attached to the table adjacent a first leg, the second active unit is attached to the table adjacent a second leg, and the third active unit is attached to the table adjacent a table edge between a third and fourth leg.

24. The actively controlled isolation table of claim 22, wherein the frame has four legs, and wherein the first active unit is attached to the table adjacent a first leg, the second active unit is attached to the table adjacent a second leg, and the third active unit is attached to the table adjacent a third leg.

25. The actively controlled isolation table of claim 17, further comprising at least one additional target element associated with the frame and at least one additional active unit attached to the table in proximity to the at least one additional target element, wherein the active unit and at least one additional active unit are mutually spaced.

26. The actively controlled isolation table of claim 17, further comprising an additional target element associated with the frame, and wherein the active unit further contains an additional electromagnet and an additional sensor, wherein the target element and electromagnet are disposed in vertical alignment to cancel vertically directed vibration and the additional target element and additional electromagnet are disposed in horizontal alignment to cancel horizontally directed vibration.

27. The actively controlled isolation table of claim 26, further comprising at least one additional active unit having target elements as claimed in claim 26, wherein a first active unit and target elements are disposed at a first leg of the frame, and a second active unit and target elements are disposed at a second leg of the frame.

28. An actively controlled isolation table, comprising:

a table;

a frame, including four legs, each having a low-stiffness isolator supporting the table relative to the frame;

a plurality of first and a second target elements, each target element responsive to a magnetic field, the first target elements oriented relative to horizontal surfaces of the frame and the second target elements being oriented relative vertical surfaces of the frame;

a plurality of discrete motion control units, each discrete motion control unit comprising a housing removably attached to the table in proximity to the target elements and with a vertical gap and horizontal gap therebetween, the target elements and motion control units being repositionable along the isolation table, each housing containing:

a first and a second electromagnet, each including a coil to generate a magnetic field and a pole piece for directing the magnetic field, the first electromagnet positioned in opposition to the first target element across the vertical gap and the second electromagnet positioned in opposition to the second target element across the horizontal gap;

a first sensor for producing a first input signal representative of a vertical vibration in the table, a second sensor for producing a second input signal representative of a horizontal vibration in the table, and a controller for processing the first input signal to produce a control signal which energizes the first electromagnet to generate a magnetic field to cancel the vertical vibration, and for processing the second input signal to produce a control signal which energizes the second electromagnet to generate a magnetic field to cancel the horizontal vibration.

29. The actively controlled isolation table as claimed in claim 28, wherein said plurality of motion control units comprises at least three units, and wherein each of said plurality of motion control units is mounted adjacent to a different leg of the frame.

30. The actively controlled isolation table as claimed in claim 28, wherein said plurality of motion control units comprises three units, and wherein the first unit is attached to the table adjacent a first leg, the second unit is attached to the table adjacent a second leg, and the third unit is attached to the table adjacent a table edge between a third and fourth leg, and wherein the frame includes a horizontal member between the third leg and fourth leg.

* * * * *